US008656727B2

(12) United States Patent
Ullman et al.

(10) Patent No.: US 8,656,727 B2
(45) Date of Patent: Feb. 25, 2014

(54) EVAPORATIVE COOLING FOR AN AIRCRAFT SUBSYSTEM

(75) Inventors: Alan Z. Ullman, Northridge, CA (US); Clyde D. Newman, Oak Park, CA (US)

(73) Assignee: The Boeing Company, Chicago, IL (US)

( * ) Notice: Subject to any disclaimer, the term of this patent is extended or adjusted under 35 U.S.C. 154(b) by 1599 days.

(21) Appl. No.: 12/099,436

(22) Filed: Apr. 8, 2008

(65) Prior Publication Data

US 2009/0249808 A1 Oct. 8, 2009

(51) Int. Cl.
*F28C 1/00* (2006.01)
*B60H 1/32* (2006.01)
*F25D 17/06* (2006.01)

(52) U.S. Cl.
USPC ............... 62/121; 62/244; 62/92; 244/135 R; 261/127

(58) Field of Classification Search
USPC .................. 62/86, 87, 90, 92, 244, 401, 402; 244/135 R; 95/10, 39, 52, 54, 92, 95, 95/96; 96/52, 53; 261/127, 136
See application file for complete search history.

(56) References Cited

U.S. PATENT DOCUMENTS

| | | | | |
|---|---|---|---|---|
| RE18,831 E * | 5/1933 | Fleisher | | 95/92 |
| 3,731,459 A * | 5/1973 | Foster | | 95/92 |
| 4,352,273 A * | 10/1982 | Kinsell et al. | | 62/87 |
| 4,419,926 A * | 12/1983 | Cronin et al. | | 454/74 |
| 4,869,071 A * | 9/1989 | Wehner et al. | | 62/133 |
| 5,084,078 A * | 1/1992 | Suzuki et al. | | 96/52 |
| 5,151,022 A * | 9/1992 | Emerson et al. | | 95/39 |
| 5,154,065 A * | 10/1992 | Herman | | 62/86 |
| 5,193,352 A * | 3/1993 | Smith et al. | | 62/90 |
| 5,214,935 A * | 6/1993 | Brunskill | | 62/80 |
| 5,299,763 A * | 4/1994 | Bescoby et al. | | 454/70 |
| 5,323,624 A * | 6/1994 | Schwalm | | 62/401 |
| 5,362,207 A * | 11/1994 | Martin et al. | | 417/243 |
| 5,390,505 A * | 2/1995 | Smith et al. | | 62/90 |
| 5,461,882 A * | 10/1995 | Zywiak | | 62/401 |
| 5,531,801 A * | 7/1996 | Sewell et al. | | 95/10 |
| 5,642,629 A * | 7/1997 | Ohman | | 62/401 |
| 6,058,715 A * | 5/2000 | Strang et al. | | 62/87 |
| 6,199,387 B1 * | 3/2001 | Sauterleute | | 62/87 |
| 6,250,097 B1 * | 6/2001 | Lui et al. | | 62/402 |
| 6,257,003 B1 * | 7/2001 | Hipsky | | 62/402 |
| 6,295,822 B1 * | 10/2001 | Mueller | | 62/402 |
| 6,381,969 B1 * | 5/2002 | Afeiche et al. | | 62/87 |
| 6,402,812 B1 * | 6/2002 | Perrotta et al. | | 95/95 |
| 6,432,367 B1 * | 8/2002 | Munk | | 422/171 |
| 6,457,318 B1 * | 10/2002 | Lui et al. | | 62/87 |
| 6,460,353 B2 * | 10/2002 | Udobot et al. | | 62/86 |
| 6,491,739 B1 * | 12/2002 | Crome et al. | | 95/54 |
| 6,500,240 B1 * | 12/2002 | Tomimatsu et al. | | 96/53 |
| 6,519,969 B2 * | 2/2003 | Sauterleute | | 62/401 |
| 6,681,592 B1 * | 1/2004 | Lents et al. | | 62/401 |

(Continued)

*Primary Examiner* — Ljiljana Ciric
(74) *Attorney, Agent, or Firm* — Hope Baldauff, LLC

(57) ABSTRACT

Apparatus, systems, and methods provide for the cooling of an aircraft subsystem. Coolant is routed through a heat-producing subsystem to absorb heat from the subsystem and to maintain the subsystem at a desired temperature. Bleed air from an aircraft engine is cooled, dehumidified, and routed to a cooling mechanism. In the cooling mechanism, a portion of the heated coolant is evaporated into the dehumidified bleed air, cooling the remaining coolant. The reduced-temperature coolant is routed back to the subsystem to absorb further heat. Humid air from the cooling mechanism and the dehumidifying mechanism is utilized by other aircraft subsystems.

13 Claims, 2 Drawing Sheets

(56) References Cited

U.S. PATENT DOCUMENTS

| | | | |
|---|---|---|---|
| 6,729,359 B2 * | 5/2004 | Jones | 244/135 R |
| 6,739,142 B2 * | 5/2004 | Korin | 62/92 |
| 6,739,359 B2 * | 5/2004 | Jones et al. | 244/135 R |
| 6,843,835 B2 * | 1/2005 | Fornai et al. | 96/53 |
| 6,928,832 B2 * | 8/2005 | Lents et al. | 62/401 |
| 6,981,388 B2 * | 1/2006 | Brutscher et al. | 62/401 |
| 6,997,013 B2 * | 2/2006 | Jones | 62/655 |
| 7,048,231 B2 * | 5/2006 | Jones | 244/135 R |
| 7,125,439 B2 * | 10/2006 | Bennett | 95/96 |
| 7,172,156 B1 * | 2/2007 | Jones | 244/135 R |
| 7,172,157 B2 * | 2/2007 | Jones | 244/135 R |
| 7,188,480 B2 * | 3/2007 | Korin | 62/92 |
| 7,219,510 B2 * | 5/2007 | Jones | 62/401 |
| 7,305,842 B1 * | 12/2007 | Schiff | 62/244 |
| 7,309,376 B2 * | 12/2007 | Barre et al. | 95/10 |
| 7,334,422 B2 * | 2/2008 | Zywiak et al. | 62/401 |
| 7,387,659 B2 * | 6/2008 | Roks | 95/54 |
| 8,468,830 B2 * | 6/2013 | Motakef et al. | 62/401 |
| 8,468,847 B2 * | 6/2013 | Klewer | 62/401 |
| 8,500,878 B2 * | 8/2013 | Cremers et al. | 244/135 R |
| 8,529,660 B2 * | 9/2013 | Diekmeyer et al. | 95/10 |
| 8,539,787 B2 * | 9/2013 | Ebigt et al. | 62/244 |
| 2001/0004837 A1 * | 6/2001 | Sauterleute | 62/402 |
| 2001/0027678 A1 * | 10/2001 | Mottram et al. | 73/23.2 |
| 2002/0121103 A1 * | 9/2002 | Udobot et al. | 62/402 |
| 2003/0056648 A1 * | 3/2003 | Fornai et al. | 96/52 |
| 2004/0014419 A1 * | 1/2004 | Lents et al. | 454/237 |
| 2004/0060317 A1 * | 4/2004 | Lents et al. | 62/401 |
| 2013/0160472 A1 * | 6/2013 | Klimpel et al. | 62/87 |

* cited by examiner

EVAPORATIVE COOLING FOR AN AIRCRAFT SUBSYSTEM

BACKGROUND

Aircraft are utilized for many different purposes, from transporting passengers and cargo to implementing weapons systems. In many of these roles, it is important to provide cooling to one or more payloads or aircraft subsystems. Certain heat-generating subsystems are temperature sensitive, requiring that the subsystem be continuously cooled to maintain a desired temperature range. Depending on the desired temperature range, the heat-generating characteristics of the subsystem, and the environmental conditions in and around the aircraft, cooling the subsystem to maintain the desired temperature range can be challenging.

Conventional cooling methods such as refrigeration systems are often large, heavy, and have significant power demands. However, due to space, weight, and power limitations associated with some aircraft, conventional cooling methods are inadequate for aircraft subsystems requiring substantial and continuous cooling. It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Apparatus, systems, and methods described herein provide for the cooling of an aircraft subsystem. According to one aspect of the disclosure provided herein, a heat exchanger includes a coolant loop that moves coolant through a heat-producing subsystem. A cooling mechanism is located downstream from the subsystem to remove heat from the coolant generated by the subsystem. The cooling mechanism includes an inlet for receiving the heated coolant and an outlet for dispensing the reduced-temperature coolant back into the coolant loop. To remove heat from the coolant, the cooling mechanism introduces a dehumidified air stream to the heated coolant to promote evaporation of the coolant. The evaporation of a portion of the coolant reduces the temperature in the remaining coolant, which is returned to the coolant loop for subsequent routing back to the heat-producing subsystem.

According to another aspect, air is received from an engine and moisture is removed. Coolant is routed through a heat-producing subsystem to absorb heat from the subsystem. A portion of the heated coolant is evaporated into the dehumidified air from the engine to cool the heated coolant. According to one implementation, the coolant includes water, a portion of which is sprayed into the dehumidified air to facilitate evaporation and cool the remaining water.

Yet another aspect of the disclosure provided herein includes cooling and removing moisture from bleed air routed from an aircraft engine. A coolant loop routes water through an aircraft subsystem to absorb heat from the subsystem. A spray cooler sprays a portion of the heated water from the coolant loop into the cooled and dehumidified bleed air. Doing so re-humidifies the bleed air and cools the remaining water, which is discharged back into the coolant loop.

The features, functions, and advantages that have been discussed can be achieved independently in various embodiments of the present invention or may be combined in yet other embodiments, further details of which can be seen with reference to the following description and drawings.

DETAILED DESCRIPTION

The following detailed description is directed to apparatus, systems, and methods for utilizing coolant evaporation to cool a heat-producing aircraft subsystem. As discussed briefly above, due to the nature of aircraft operations, providing cooling functionality to reduce and maintain the temperature of a payload or subsystem is subject to certain fixed constraints. The specific operational and physical characteristics of the particular platform supporting the subsystem, as well as the power consumption, footprint, and weight characteristics of the cooling system are just a few of the parameters that must be considered and reconciled when choosing or designing a cooling system. For example, utilizing ice to cool a subsystem is not practical in most aircraft scenarios given the weight and rapid consumption associated with ice. Typical refrigeration systems also are weight prohibitive in many aircraft operational scenarios in which substantial continuous cooling is desired.

Utilizing the concepts and technologies described herein, water or other coolant may be used to absorb heat from a subsystem, which may then be dissipated through evaporation of a portion of the coolant using bleed air from an engine compressor. In doing so, continuous cooling of aircraft subsystems is achieved in an efficient, weight-acceptable manner. Throughout this disclosure, embodiments are described with respect to an aircraft subsystem. It should be understood that the concepts presented herein are equally applicable to cool any system, subsystem, and/or payload of any platform, including aircraft, ships, vehicles, or any other platform in which pressurized air may be stored or collected and used in the evaporation of coolant in the manners described below.

Figure 1:
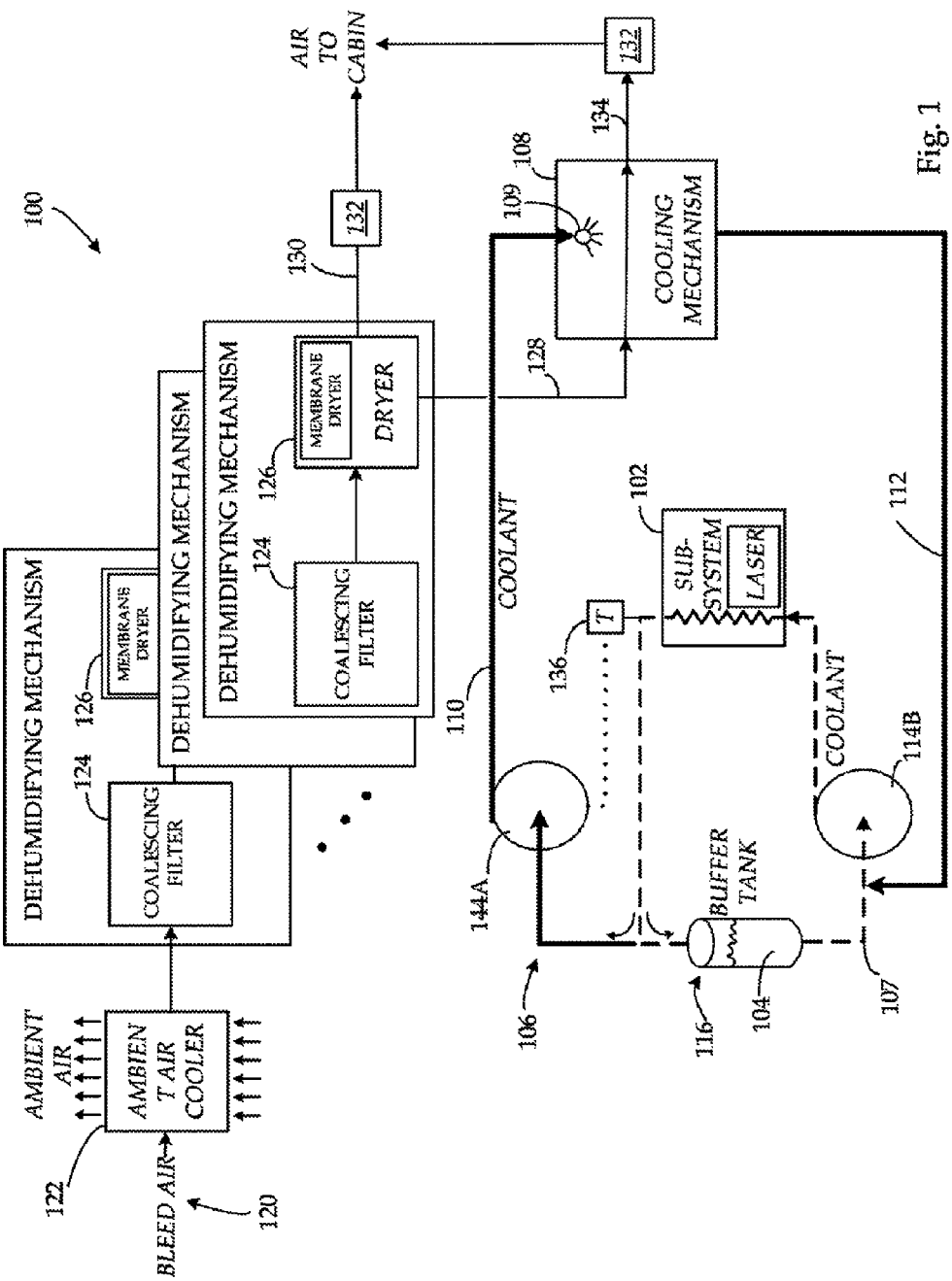
FIG. 1 is a schematic diagram showing a cooling system for cooling a heat-producing aircraft subsystem according to various embodiments presented herein.

In the following detailed description, references are made to the accompanying drawings that form a part hereof, and which are shown by way of illustration, specific embodiments, or examples. Referring now to the drawings, in which like numerals represent like elements through the several figures, evaporative cooling of an aircraft subsystem will be described. FIG. 1 shows a schematic diagram of a cooling system 100 according to one embodiment described herein. The cooling system 100 is used to reduce and maintain the temperature of a heat-producing subsystem 102. The cooling system 100 may be referred to herein as a heat exchanger, as it functionally provides for the transfer of heat between the heat-producing subsystem 102, coolant 104, and bleed air 120.

It should be understood that the heat-producing subsystem 102 may be any type of payload or aircraft system/subsystem that generates heat. According to one implementation, the heat-producing subsystem 102 is a laser or other directed energy weapon or device. Due to the nature of lasers, substantial cooling is typically required to support sustained operation of the laser. The concepts described herein provide this sustained cooling at a weight that allows the cooling system 100 to be utilized on an aircraft or other platform with strict weight limitations.

The cooling system 100 includes a coolant loop 106 for routing coolant 104 through the heat-producing subsystem 102 and through a cooling mechanism 108. According to one embodiment, the coolant 104 may be water or an aqueous solution such as ethylene glycol or propylene glycol, which is used as described below to absorb heat from the heat-producing subsystem 102 and subsequently evaporated to dissipate the absorbed heat. Water is a weight-efficient material with respect to evaporation. Due to the relatively high heat of vaporization of water, water has the capacity to absorb a large quantity of heat for a relatively small weight. Due to its volatility at high temperatures, water may be readily evaporated, and because of its availability, water within the cooling system 100 may be readily replaced. Although the coolant 104 may include water or other aqueous liquids according to various implementations, it should be understood that any type of liquid may be used as the coolant 104 without departing from the scope of this disclosure.

The coolant 104 may be routed through the heat-producing subsystem 102 in a manner that most efficiently absorbs heat from the heat-producing subsystem 102. For example, a radiator-type configuration may be used to circulate the coolant 104 through the heat-producing subsystem 102 to absorb heat and effectively cool the heat-producing subsystem 102. After absorbing heat from the heat-producing subsystem 102, a portion of the coolant 104 is routed into a downstream section 110 of the coolant loop 106. The coolant 104 may be routed directly from the heat-producing subsystem 102 to the downstream section 110 of the coolant loop 106, or be routed to the downstream section 110 via a buffer tank 116, which is described in detail below. Being downstream from the heat-producing subsystem 102, the coolant 104 within the downstream section 110 of the coolant loop 106 is heated to a temperature in which it can no longer efficiently absorb heat from the heat-producing subsystem 102. For this reason, the temperature of the heated coolant 104 must be reduced using the cooling mechanism 108 before the coolant 104 enters an upstream section 112 of the coolant loop 106, which supplies the coolant 104 to the heat-producing subsystem 102.

As stated above, the coolant loop 106 may include a buffer tank 116. The buffer tank 116 should be of sufficient volume to store the quantity of water or other coolant 104 used within the coolant loop 106 and to allow for expansion and contraction of the coolant 104 within the cooling system 100 that results from temperature changes. Because embodiments described herein provide for the evaporation of coolant 104 to dissipate heat, the buffer tank 116 should be of sufficient volume to store enough coolant 104 to allow for the continuous consumption of coolant 104 for the desired operational duration of the heat-producing subsystem 102.

According to the embodiment shown in FIG. 1, the coolant loop 106 includes a secondary coolant loop 107. The buffer tank 116 is positioned within the secondary coolant loop 107 that circulates coolant 104 between the buffer tank 116 and the heat-producing subsystem 102. Heated coolant from the heat-producing subsystem 102 is drawn from the buffer tank 116 and routed to the cooling mechanism 108. Coolant 104 that has been cooled is then routed back into the secondary coolant loop 107 and through the heat-producing subsystem 102 to absorb further heat and control the temperature of the heat-producing subsystem 102.

In order to route the coolant 104 through the various sections and elements of the coolant loop 106, one or more pumps 114A and 114B are used. It should be appreciated that any number and type of pumps may be used to control the flow of coolant 104 through the coolant loop 106, depending on the configuration of the coolant loop 106. For example, in the embodiment shown in FIG. 1, the pump 114B circulates the coolant 104 between the buffer tank 116 and the heat-producing subsystem 102. The pump 114A pumps coolant 104 from the buffer tank 116 to the cooling mechanism 108.

While the buffer tank 116 is shown in FIG. 1 to be positioned within the secondary coolant loop 107, it should be understood that the cooling system 100 may be configured such that the buffer tank 116 is positioned anywhere within the coolant loop 106, with or without the secondary coolant loop 107. Pumps 114A and 114B may be positioned at any location to control the flow of coolant 104 between the heat-producing subsystem 102, the cooling mechanism 108, and the buffer tank 116. Additionally, a temperature control 136 may be used to measure the temperature of the coolant 104 discharged from the heat-producing subsystem 102, or of the heat-producing subsystem 102 itself. The temperature of the coolant 104 or of the heat-producing subsystem 102 is then used to determine the flow rate at which coolant 104 should be pumped through the coolant loop 106 in order to maintain the temperature of the heat-producing subsystem 102 within a desired range.

As previously discussed, the cooling system 100 absorbs heat from the heat-producing subsystem 102 using the coolant 104. Once the coolant 104 is heated, the heat must be dissipated before the coolant 104 can be re-circulated through the heat-producing subsystem 102 to absorb further heat. Embodiments provide for cooling the coolant 104 via an evaporative mechanism within the cooling mechanism 108. When liquid evaporates, the energy required to turn the liquid into vapor comes from the liquid. As a result, the liquid becomes cooler.

In order to efficiently evaporate coolant 104, various embodiments utilize a cooling mechanism that includes a spray cooler. The spray cooler has two inlets and two outlets for receiving and discharging air and coolant streams. The spray cooler additionally includes a spray nozzle 109 that is configured to spray a mist, or droplets, of the coolant 104 into a dehumidified air stream passing through the cooling mechanism 108. In doing so, a portion of the coolant 104 evaporates into the air stream, which cools the remaining liquid coolant 104. The temperature of the liquid coolant 104 is reduced and the low-temperature, or reduced-temperature, coolant 104 is deposited into the upstream section 112 of the coolant loop 106. From there, the coolant 104 is routed to the secondary coolant loop 107 and returned to the heat-producing subsystem 102 to re-absorb heat before being routed back to the cooling mechanism 108.

To effectively dissipate heat by evaporating a portion of the coolant 104, a dry air source is provided to the cooling mechanism 108. According to one embodiment, bleed air 120 is drawn into the cooling system 100 from an aircraft engine, cooled, and dehumidified, before utilizing the dehumidified air in the cooling mechanism 108. The bleed air from a compressor of an aircraft engine can be extremely hot and full of moisture. To enable the evaporation of the coolant 104 without heating the coolant 104, the bleed air is cooled and dehumidified.

To cool the bleed air 120, one embodiment provides an air cooling mechanism, such as an ambient air cooler 122. The ambient air cooler 122 cools the bleed air 120 by subjecting the ducting or other air transport mechanism to an ambient air stream outside of the aircraft. Alternatively, the ambient air stream may be captured from outside the aircraft and routed to the ambient air cooler 122. The ambient air cooler 122 may cool the bleed air 120 to a temperature close to the ambient air temperature. It should be appreciated that any other air cooling mechanism may be used in addition to or in place of the ambient air cooler 122 to cool the bleed air 120. For example, cooling may be effected through the provision of passages in the skin of the aircraft and conduction to the aircraft structure, or by cooling with available heat sinks such as aircraft fuel.

Due to the compression of the air in the aircraft engine and cooling the bleed air 120 in the ambient air cooler 122, the bleed air exiting the ambient air cooler 122 may be saturated with water and will frequently include entrained liquid water. To remove any water droplets from the bleed air 120, the bleed air 120 is routed from the ambient air cooler 122 to a dehumidifying mechanism. The dehumidifying mechanism may include a coalescing filter 124 and/or a dryer 126. The coalescing filter 124 separates the liquid water that may be included in the bleed air 120. After removing the liquid water, the bleed air 120 is further dried to maximize the amount of coolant 104 that may be evaporated into the air, which maximizes the cooling effect of the cooling mechanism 108. To further dry the bleed air 120, the bleed air 120 is routed to a dryer 126. According to one implementation, the dryer 126 includes a membrane dryer. Membrane dryers provide densely packed membranes that diffuse the water vapor in the bleed air 120. It should be appreciated that the present disclosure is not limited to the use of membrane dryers. Desiccant drying techniques or any other known techniques for removing moisture from the bleed air 120 may be utilized within the scope of this disclosure.

While dehumidifying the bleed air 120, the dryer 126 partitions the bleed air 120 into two air streams. The first air stream is a pressurized dehumidified air stream 128 that results from drying the pressurized bleed air 120 received by the dryer 126. The second air stream is an ambient-pressure humidified air stream 130 that results from the absorption of water vapor removed from the bleed air 120. This ambient-pressure humidified air stream 130 may be routed through a pressure reduction valve 132, which decreases the humidity of the air stream and cools the air stream. The ambient-pressure humidified air stream 130 may further be routed to a cabin pressurization system to pressurize the aircraft cabin, which is a typical function of most bleed air systems.

The dehumidified air stream 128 is routed to an inlet of the cooling mechanism 108. It should be appreciated that the dehumidified air stream 128 may originate as a dry ambient air stream without being produced through a process of drying bleed air 120. As discussed above, according to one embodiment, the cooling mechanism 108 includes a spray nozzle 109 for dispersing coolant 104 into the dehumidified air stream 128. It should be understood that alternative methods for reducing the temperature of the coolant 104 using the dehumidified air stream 128 may be used in lieu of the spray nozzle 109. For example, other types of gas/liquid contactors may be utilized that rely on intimate contact between gas and liquid streams, but without spraying the liquid into the gas. Gas/liquid contactors employing structured or random packing may be utilized as the cooling mechanism 108, as they offer intimate gas/liquid contact with mass and heat transfer.

Alternatively, the cooling mechanism 108 may allow contact between the coolant 104 and the dehumidified air stream 128 through transport across membranes. This implementation would allow for the evaporation of the coolant 104, but would prevent the saturation of the dehumidified air stream 128 with liquid droplets, which may or may not be desirable depending on the desired application for the air discharged by the cooling mechanism 108. Returning to the embodiment shown in FIG. 1, after entering the cooling mechanism 108 through an inlet and absorbing coolant 104 from the evaporation process, a re-humidified air stream 134 that has been re-saturated with coolant 104 is discharged through an outlet of the cooling mechanism 108. Similar to the humidified air stream 130 discharged from the dryer 126, the re-humidified air stream 134 may be routed through a pressure reduction valve 132 and to a cabin pressurization system or other aircraft subsystem.

It should be understood that the specific elements of the cooling system 100 may be chosen according to the operational parameters of the cooling system 100. For example, the dehumidifying capacity of the dryer 126, such as a membrane dryer, may depend upon the volume of bleed air 120 to be handled, as well as the desired humidity and volume characteristics associated with the resulting dehumidified air stream 128 and humidified air stream 130. These parameters, in turn, may be dependent upon the platform in which the cooling system 100 is operating, the amount of cooling required for the heat-producing subsystem 102, and the operational characteristics of the cooling mechanism 108, among others. It should be appreciated that the concepts described herein and shown in FIG. 1 may be manipulated in any number of ways depending on the specific application of the cooling system 100.

As a further example, according to an alternative embodiment, the cooling system 100 may include more than one dryer 126 and cooling mechanism 108. Additional dryer 126 and cooling mechanism 108 combinations may be applied to the coolant 104 using the humidified air stream 130 and/or the re-humidified air stream 134 as input into the additional dryer 126 to create another dehumidified air stream that may be used to further evaporate and cool the coolant 104 with an additional cooling mechanism 108. The drying and evaporating process may be performed multiple times within the coolant loop 106 to achieve the desired cooling capabilities to counteract the heat-producing capabilities of the heat-producing subsystem 102. This can be made more effective by the progressive reduction of the pressure of the bleed air 120 and cooled bleed air 134 so as to make each stage of the dryer 126 effective in separation of the moist air from the dry stream.

It should be appreciated that the elements of the cooling system 100 may be controlled with a computing device having a processor operative to execute computer-readable instructions stored on a computer storage medium. Using the computer-readable instructions, the processor would monitor the temperature of the heat-producing subsystem 102, control the flow of coolant 104 through the coolant loop 106, control the cooling mechanism 108, and control the pressure of the humidified air exiting the cooling system 100 to be used in alternative aircraft subsystems.

Figure 2:
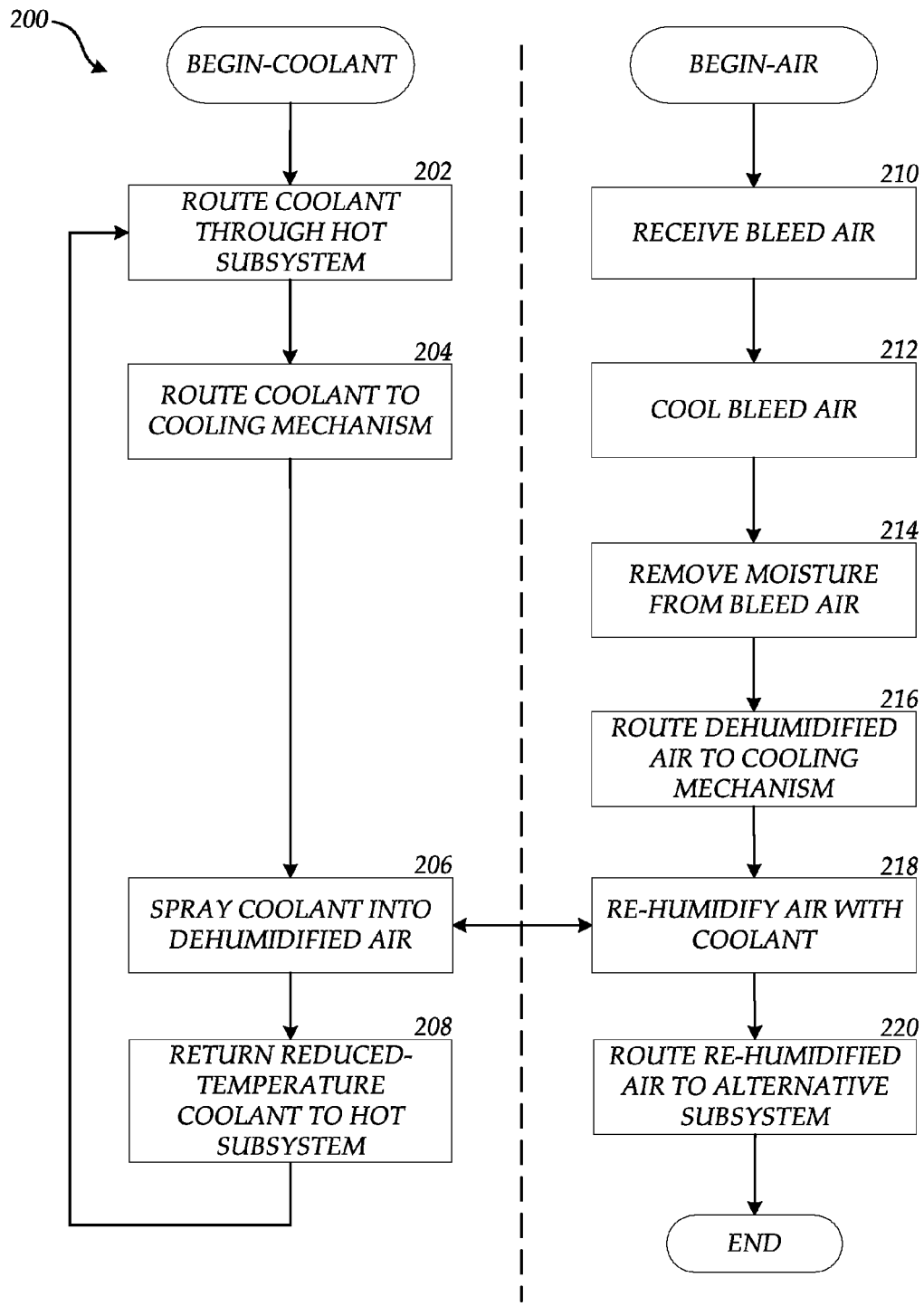
FIG. 2 is a flow diagram illustrating a method for cooling a heat-producing aircraft subsystem according to various embodiments presented herein.

Turning now to FIG. 2, an illustrative routine 200 for reducing the temperature of a heat-producing subsystem 102 will now be described in detail. It should be appreciated that more or fewer operations may be performed than shown in the FIG. 2 and described herein. Moreover, these operations may also be performed in a different order than those described herein. FIG. 2 shows the routine 200 separated into two simultaneous processes, the coolant circulation through the cooling system 100 and the bleed air routing and manipulation through the cooling system 100. As described herein, the two processes interact within the cooling mechanism 108. The routine 200 begins at operation 202, where coolant 104 is routed through the heat-producing subsystem 102, where heat from the subsystem is absorbed by the lower temperature coolant 104. From operation 202, the routine 200 continues to operation 204, where the heated coolant 104 is routed through an inlet of the cooling mechanism 108.

As described above, according to one implementation of the cooling mechanism 108, a portion of the heated coolant 104 is sprayed into a dehumidified air stream 128 with a spray nozzle 109 of the cooling mechanism 108 at operation 206. Doing so reduces the temperature of the coolant 104 and re-saturates the dehumidified air stream 128 to create low-temperature or reduced-temperature coolant 104 and a re-humidified air stream 134. From operation 206, the routine 200 continues to operation 208, where the reduced-temperature coolant 104 is discharged through an outlet of the cooling mechanism 108 into the upstream section 112 of the coolant loop 106. From operation 208, the routine returns to operation 202 and proceeds as described above.

At the same time that the routine 200 circulates coolant 104 through the coolant loop 106, the routine 200 prepares the bleed air 120 to absorb evaporated coolant 104. This bleed air preparation process begins at operation 210, where bleed air 120 is received from an aircraft engine. At operation 212, the bleed air 120 is cooled using the ambient air cooler 122. From operation 212, the routine 200 continues to operation 214, where moisture is removed from the bleed air 120. As described above, removing moisture may include removing liquid water from the bleed air 120 using the coalescing filter 124, as well as drying or dehumidifying the air using the dryer 126.

After dehumidifying the bleed air 120, the resulting dehumidified air stream 128 is routed to an inlet of the cooling mechanism 108 at operation 216. At operation 218, the dehumidified air stream 128 is re-saturated with coolant 104 sprayed into the air stream to create a re-humidified air stream 134. This process not only cools the coolant 104 heated by the heat-producing subsystem 102, but also may serve to cool the dehumidified air stream 128, which may be desirable depending on the application of the resulting re-humidified air stream 134. From operation 218, the routine 200 continues to operation 220, where the re-humidified air stream 134 is routed to another aircraft system or subsystem. As described above, this output from the cooling mechanism 108 may be used to pressurize the aircraft cabin, or may be routed to an additional dryer 126 and cooling mechanism 108 to increase the cooling capacity of the cooling system 100.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A cooling system for an aircraft subsystem, comprising:
   a coolant loop configured to move a coolant through a heat-producing subsystem;
   a dehumidifying mechanism operative to receive bleed air and partition the bleed air into a dehumidified air stream and a humidified air stream; and
   a cooling mechanism positioned within the coolant loop downstream from the heat-producing subsystem and comprising
      a first inlet for receiving the dehumidified air stream,
      a second inlet for receiving the coolant from the heat-producing subsystem,
      an evaporative mechanism operative to introduce the coolant to the dehumidified air stream to evaporate a portion of the coolant into the dehumidified air stream, creating a reduced-temperature coolant and a re-humidified air stream,
      a first outlet for discharging the re-humidified air stream, and
      a second outlet for discharging the reduced-temperature coolant into the coolant loop upstream of the heat-producing subsystem.

2. The cooling system of claim 1, wherein the coolant comprises water.

3. The cooling system of claim 1, wherein the evaporative mechanism comprises a spray nozzle operative to spray a portion of the coolant into the dehumidified air stream to evaporate coolant into the dehumidified air stream and create the reduced-temperature coolant and the re-humidified air stream.

4. The cooling system of claim 1, wherein the dehumidifying mechanism comprises a membrane dryer.

5. The cooling system of claim 4, wherein the dehumidifying mechanism further comprises a coalescing filter to separate liquid water from the bleed air.

6. The cooling system of claim 1, wherein the humidified air stream is routed from the dehumidifying mechanism to pressurize an aircraft cabin.

7. The cooling system of claim 1, further comprising a pressure reduction valve operative to receive the humidified air stream partitioned from the dehumidifying mechanism.

8. The cooling system of claim 1, further comprising an ambient air cooler operative to decrease a temperature of the bleed air from the engine prior to receipt by the dehumidifying mechanism.

9. The cooling system of claim 1, further comprising a buffer tank and a secondary coolant loop within the coolant loop, wherein the buffer tank and the heat-producing subsystem are positioned within the secondary coolant loop, wherein the secondary loop circulates coolant between the buffer tank and the heat-producing subsystem, and wherein the secondary loop routes coolant from the heat-producing subsystem directly to the coolant loop.

10. The cooling system of claim 1, wherein the heat-producing subsystem comprises a laser.

11. A cooling system for an aircraft subsystem, comprising:
    a cooling mechanism operative to receive bleed air and to cool the bleed air;
    a dehumidifying mechanism operative to receive the bleed air from the cooling mechanism, partition the bleed air into a dehumidified air stream and a humidified air stream, and to remove moisture from the bleed air to create the dehumidified air stream;
    a coolant loop configured to move water through the aircraft subsystem;
    a spray cooler positioned within the coolant loop downstream from the aircraft subsystem and comprising
       a first inlet for receiving the dehumidified air stream,
       a second inlet for receiving the water from the aircraft subsystem,
       a spray nozzle operative to spray a portion of the water into the dehumidified air stream to evaporate water into the dehumidified air stream, creating a reduced-temperature water output and re-humidified air output,
       a first outlet for discharging the re-humidified air output, and
       a second outlet for discharging the reduced-temperature water output into the coolant loop upstream of the aircraft subsystem.

12. The cooling system of claim 11, wherein the dehumidifying mechanism comprises a coalescing filter and a membrane dryer, and wherein the membrane dryer is operative to partition the bleed air into the dehumidified air stream and the humidified air stream.

13. The cooling system of claim 11, further comprising a plurality of dehumidifying mechanisms and a plurality of spray coolers within the coolant loop operative to further dehumidify air and to enable further evaporation of water in the coolant loop.

* * * * *